United States Patent [19]

Hirose

[11] Patent Number: 4,507,127
[45] Date of Patent: Mar. 26, 1985

[54] SYSTEM FOR RECOVERING RESOURCES FROM SLUDGE

[75] Inventor: Yasuo Hirose, Kanagawa, Japan

[73] Assignee: Nippon Furnace Kogyo Co., Ltd., Tokyo, Japan

[21] Appl. No.: 415,963

[22] Filed: Sep. 8, 1982

[30] Foreign Application Priority Data

Dec. 21, 1981 [JP] Japan .................. 56-205251
Dec. 21, 1981 [JP] Japan .................. 56-205252
Dec. 21, 1981 [JP] Japan .................. 56-205253
Mar. 23, 1982 [JP] Japan .................. 57-044553
Mar. 23, 1982 [JP] Japan .................. 57-044554
May 25, 1982 [JP] Japan .................. 57-087296

[51] Int. Cl.³ .................. C10J 3/20; C10J 3/30
[52] U.S. Cl. .................. 48/89; 48/111; 110/224; 110/229
[58] Field of Search .......... 110/106, 224, 229, 232, 110/254; 201/2.5, 25, 31; 48/111, 89

[56] References Cited

U.S. PATENT DOCUMENTS 4,060,042 11/1977 Baraldi et al. .............. 110/224
4,245,570 1/1981 Williams .................. 110/224
4,311,103 1/1982 Hirose .................... 110/224 X
4,388,875 6/1983 Hirose .................... 110/224
4,398,476 8/1983 Suzuki et al. .............. 201/25

Primary Examiner—Peter Kratz
Assistant Examiner—Joye L. Woodard
Attorney, Agent, or Firm—Beveridge, DeGrandi & Weilacher

[57] ABSTRACT

This invention is a system for recovering resources from sludge in which sludge including water of 90 to 70 percent is first supplied to a sludge concentrator invented by the inventor through a forced supply equipment where the sludge is concentrated to have water content up to about 60 percent; then is sent to a drying furnace having a fluidized sand bed.

A product yielded in the said drying furnace is separated to gas and solid. After the separated gas is pressurized by a fan and is heated by a heat exchanger through a circulation passage, a required part thereof is supplied to the drying furnace as gas for drying and the remainder is sent to the said sludge concentrator. After the water content is removed from the gas concentrated and the gas yielded by the said sludge concentrator is used in the system as gaseous fuel. Further, the solid separated is dried and distilled through a gasifying apparatus designed by the inventor to recover gaseous fuel, and in addition, the separated solid is fed into an ash disposal equipment designed by the inventor; the ash generated from the gasifying apparatus is also supplied to the said ash disposal equipment to allow the ash to be melted and then to allow the ash to be solidified in the ash disposal equipment to take out the solidified one as massive ashes; the exhaust gases from these gasifying apparatus and ash disposal equipment are supplied to the said heat exchanger.

5 Claims, 20 Drawing Figures

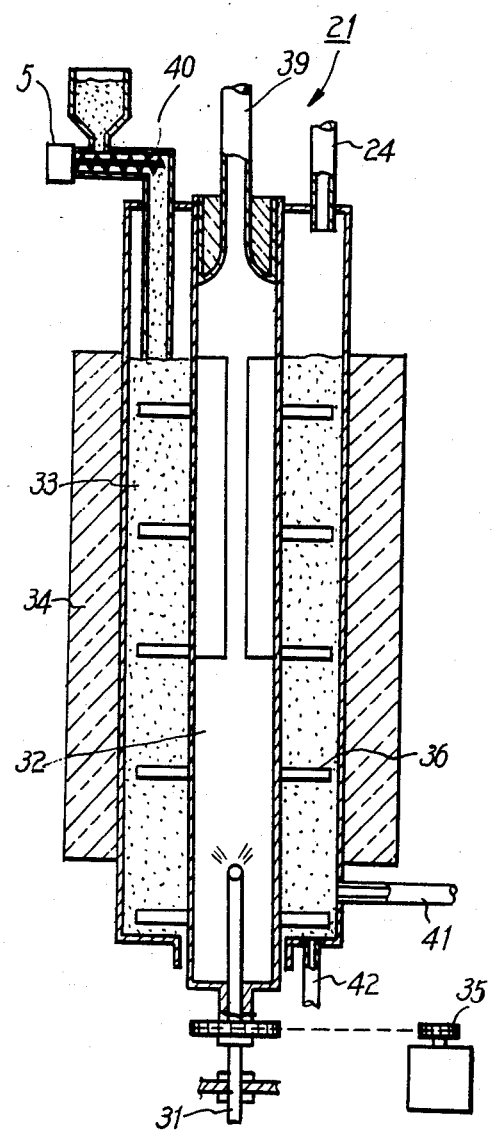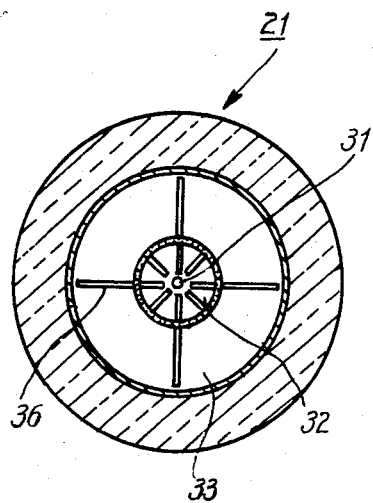
Fig-6-
Fig-7-

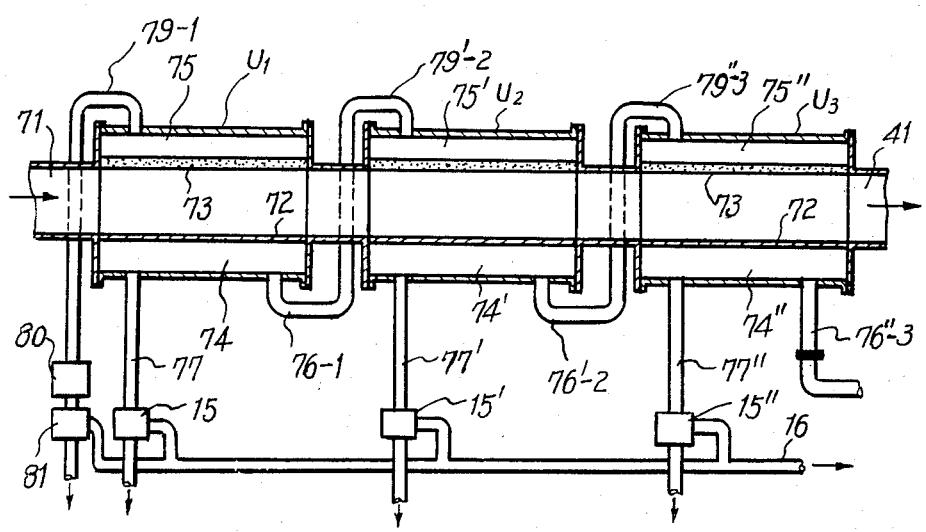

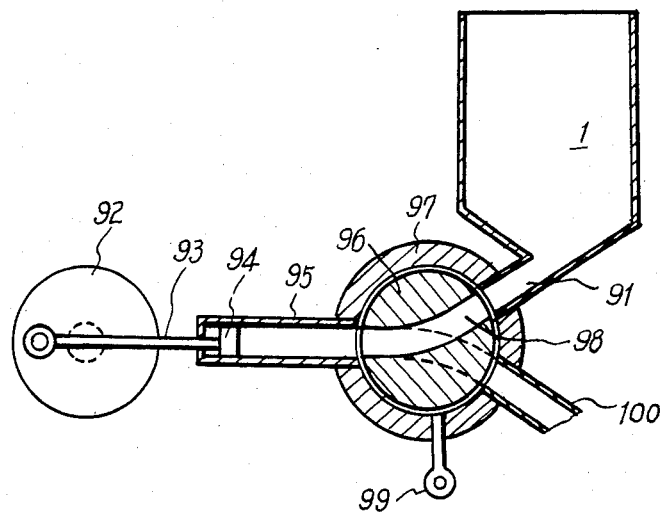
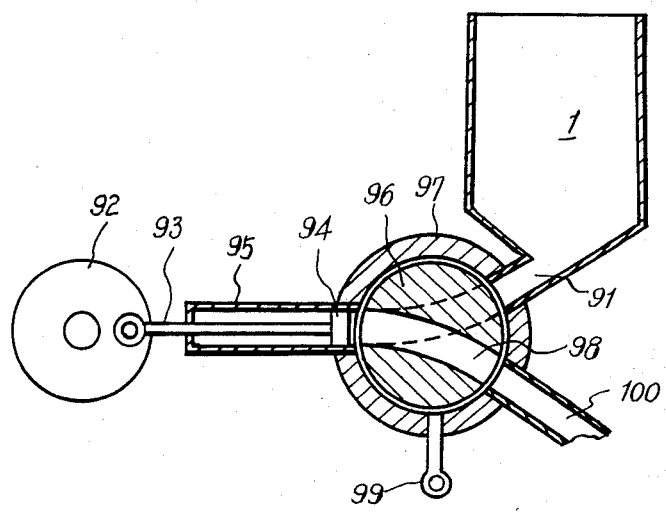

SYSTEM FOR RECOVERING RESOURCES FROM SLUDGE

BACKGROUND OF THE INVENTION

Conventionally, it has been considered that organic sludge requires replenishing auxiliary fuel to burn it. The inventor has conducted many studies on sludge incineration for many years and has invented a technology to be able to perform sludge incineration with replenishment of less auxiliary fuel by a combustion method utilizing self-heating energy effectively, even of considerably low calorific sludge and/or even of sludge with high water rate and has applied for a Japanese patent, (application No. Sho-55-169165). FIG. 1 shows this incineration system.

Prior to the explanation of this invention, the sludge incineration system in FIG. 1 will be described.

Sludge having a water content reduced to 90 to 70 percent by a mechanical dehydrogation method is contained in hopper 1. Forced supply means 2 such as a screw conveyor is provided at the bottom of said hopper 1 to supply the sludge forcibly into heater 3. The sludge is heated by the said heater, the sludge is fluidized and then fed into drying furnace 4 having a fluidized sand bed. The dried products yielded in the said drying furnace 4 are sucked by blower 11 and led into separation means 5, and are separated to solidified sludge and dry gas extracted from the sludge. The separated solid is fed into combustion furnaces by a constant quantity supply means such as screw conveyor 6. The combustion furnaces shown in FIG. 1 compose a two-sludge combustion system consisting of incomplete combustion furnace 7 and complete combustion furnace 7'; such an arrangement can largely reduce the $NO_2$ generation rate.

The combustion air for these furnaces is, after being heated in air heater 14 installed at the periphery of the complete combustion furnace 7', supplied to incomplete combustion furnace 7 and complete combustion furnaoe 7' as required. The gas produced from complete combustion furnace 7', sucked by exhaust fan 10, is passed through heat exchanger 8 and filter 9 and exhausted.

The gas separated by the said separation means 5 is pressurized by blower 11 up to 1000 through 3000 mm water column and elevated to a termperature as high as 200° to 400° C., and is sent through circulation passage 12. A part of the gas is fed into drying furnace 4 having the said fluidized bed for drying, and the remainder is supplied to the said heater 3 for heating.

The gas heated in heater 3 is led into drain separation means 15, and after the drain included is wasted out of the system is led through gaseous fuel supply pipeline 16 into combustion furnace 7, for example, as gaseous fuel.

As such, when the heating gas mainly involving steam is heated through the sludge incineration system as shown in FIG. 1, after the drain is expelled out of the system by drain separation means 15, the heated gas is fed into combustion furnace 7. Therefore, the sludge can be burnt smoothly with a relatively small fuel replenishment rate and without harmful gas discharges.

Sewage sludge is taken up as an example. The sewage sludge solid obtained when the sewage sludge is dried by a drying furnace and is separated through a separation means has heating energy from 2000 to 5000 cal/kg and the contents thereof are ash, about 50 percent, and of the remaining portion, about 45 percent is volatile matter and about 5 percent is fixed carbon. The volatile matter can be made into a gaseous fuel by allowing almost all of its quantity to vaporize at an atnmospheric temperature from 700° to 450° C. The required time is shorter if the temperature is higher as shown in FIG. 2.

Moreover, the inventor can reduce the sludge quantity to be disposed of by drying furnace 4 and combustion furnace 7 by means of a concentration apparatus which heats sludge and at the same time allows the evaporation of water involved in the sludge and the expulsion of the evaporated steam out of the system at the position of heater 3, instead of merely using heater 3 to heat sludge. Therefore, the sludge can be incinerated smoothly, even though drying furnace 4 and combustion furnace are both compacted.

The concentration apparatus shown in FIG. 3 and 4 was invented by applicant and a patent was applied for covering it, (Japanese application No. Sho 56-44743), corresponding to U.S. Pat. No. 4,388,875.

In FIG. 3 the sludge transferred by forced supply means 2 installed at the bottom of sludge-containing hopper 1 is first fed into heating chamber 17 to which heating gas is supplied. The sludge is pressurized and heated in the said heating chamber 17 and is then injected into evaporation chamber 18 under a low pressure. The gas evaporated by the said evaporation chamber 18 is sucked through the suction pipeline having condenser 19, and the water included in the gas is removed by condenser 19 out of the system. A part of the sludge taken from the bottom of evaporation chamber 18 is supplied to drying furnace 4 having a fluidized sand bed but almost all of the sludge is again supplied to heating chamber 17 and is treated during the circulation.

The heating gas fed into heating chamber 17 is, after being used for heating, taken out of heating chamber 17, lowered in temperature a little and supplied as gaseous fuel, to combustion furnace 7 through supply pipeline 16, after the drain is removed by drain separation means 15.

In FIG. 4, the two sets of heating chambers 17 and evaporation chamber 18 are arranged in series, and by providing two or more such sets, sludge concentration can be carried out more effectively and can supply sludge with lower water content to drying furnace 4 having a fluidized sand bed in the next process.

This invention related to a system for recovering resources from sludge. The sludge incineration systems shown in FIG. 1 incinerates sludge sufficiently with the self-calorific value thereof only if the heat energy is cleverly utilized, and auxiliary fuel may need to be added only for starting the incineration. However, if the heat energy is more effectively utilized, soil improvers for agriculture can be obtained, gaseous fuel can be recovered or massive ash suitable for concrete aggregate can be obtained. It has been clarified that such resources are recovered effectively at the initial process of that treatment by sludge concentration with allowing the water content of sludge to be reduced by utilizing excess heat of the treatment.

BRIEF DESCRIPTION OF THE DRAWINGS

FIGS. 6 and 7 are respectively vertical and horizontal sectional drawings showing one embodiment of the gasification apparatus used in this invention.

FIG. 12 is a side cross-sectional drawing of the concentration equipment having three heating and dehydrating units used in the system for recovering resources from sludge relating to this invention.

FIGS. 13 and 14 are respectively side cross-sectional drawings which show the supply means to push sludge into supply pipe 100 intermittently under a strong pressure at the side of the concentration equipment used in combination with forced supply means 2 in the system for recovering resources from sludge relating to this invention; FIGS. 13 and 14 give respectively the conditions under which sludge is sucked from the hopper and sludge is pushed toward the supply pipe.

FIG. 20 shows the concentration equipment provided with the three heating and dehydrating units in series illustrated in FIG. 17, 18 and 19 as an example. This concentration equipment has also the dehydrating and the heat energy recovering effects explained according to FIG. 9.

DETAILED DESCRIPTION

Figure 5:
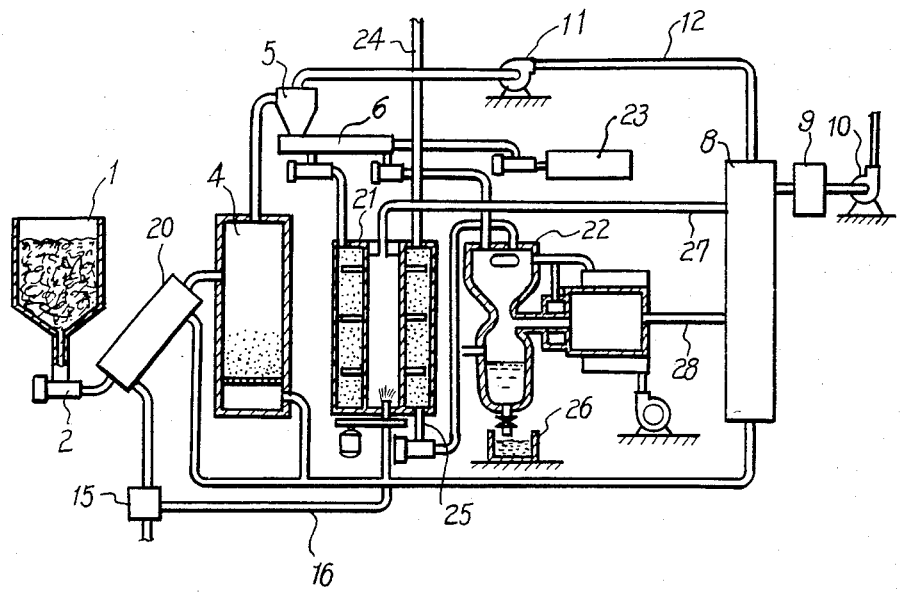
FIG. 5 is a drawing to explain the system for recovering resources from sludge relating to this invention.

In FIG. 5, forced supply means 2 is installed at the bottom of sludge-containing hopper 1 so that the sludge is fed into concnetration apparatus 20 where the sludge is heated, dehydrated, concentrated and supplied to drying furnace 4 which has a fluidized sand bed. The dried products yielded in the said drying furnace 4 are drawn by blower 11 to a separation means such as cyclone 5 which separates solidified sludge and dried gas extracted from the sludge. The separated solid is supplied for suitable use by a constant solid supply means such as screw conveyor 6. The supply may be to symbol 21 representing a gasifying equipment, symbol 22 representing an ash disposer, and symbol 23 representing the application of the said solid to be used as a soil improver for agriculture as it is.

The gasifying equipment 21 has a construction so that the solid supplied to a distillation or a carbonization chamber around the combustion chamber is distilled or carbonized with the combustion heat from the combustion chamber at the center and the gas for promoting the distillation or the carbonization from the bottom, and gaseous fuel is recovered from pipe 24.

The ash taken out of the bottom of said distillation chamber is fed into ash disposer 22 by ash supplier 25.

The ash disposer 22 has a cyclone combustion chamber included therein which receives the solid and the ash obtained from the said gasification chamber 21. The massive ash solidifying method of ash with water is made possible by a water tank at the bottom of disposer 22.

The exhaust gas from gasification equipment and the exhaust gas from the second stage combustion chamber are led to heat exchanger 8 through exhaust gas pipeline 28 and are discharged by exhaust fan 10 through filter 9, after they are cooled. The gas obtained from the said separation means, mainly containing steam, is pressurized by blower 11, elevated in temperature through heat exchanger 8, and carried through circulation passage 12. A part thereof, namely, a quantity required for drying sludge to be supplied to drying furnace 4 is again fed into the said drying furnace, and the remaining gas is sent to concentration apparatus 20 as dehydration gas. The gas heated and dehydrated by the said concentration apparatus and the gas volatilized from the sludge by the said concentration apparatus are sent through gaseous fuel supply pipeline 16 and are recovered as gaseous fuel after their drain is expelled out of the system. This gaseous fuel is fed to the gas burner of gasification equipment 21, for example.

In FIGS. 6 and 7, gas burner 31 is fitted to the lower end of the center axis of tall, cylindrical combustion chamber 32. Distillation chamber 33 surrounds the periphery of the said combustion chamber.

The circumferential wall of the said combustion chamber is designed so that the wall may be rotated at a slow speed from 0.5 to 2.0 rpm by turning means 35; agitation vanes 36, are fitted so as to be allowed to fix on the circumferential wall of the said combustion chamber and to project into the distillation chamber 33. Solidified sewage sludge supply means 40 is mounted on the top of the distillation chamber 33, fuel exit pipe 24 is fitted to the top wall of the said chamber 33, gas supply pipe 41 for promoting volatilization is fitted to the lower circumferential wall of the said distillation chamber 33, and ash exit pipe 42 is mounted on the bottom of the said distillation chamber. Moreover, several fins 37 project inward from the surrounding wall of the said combustion chamber, the top surface of the said combustion chamber is covered by heat insulator, combustion gas exhaust pipes 27 and 39 are mounted upon the top of the said combustion chamber, and the exhaust gas is discharged through heat exchanger 8, filter 9 and exhaust fan 10 as shown in FIG. 5.

The solid obtained from separation by separation means 5 has generally been dried to include 5 percent or less of water and powder about 0.2 mm in diameter. The powder is agitated in the said distillation chamber having an atmospheric temperature of from 500° to 700° C. while the gas for promoting volatilization is supplied. Almost all the volatile matter in the powder is volatilized within 90 seconds, and this volatilized gas is recovered through gaseous fuel exit pipe 24; about one half of the powder remains ash. The ash left after the volatilization is taken out of ash exit pipe 42 and is carried to ash disposal device 22 by screw conveyor 25.

Figure 8:
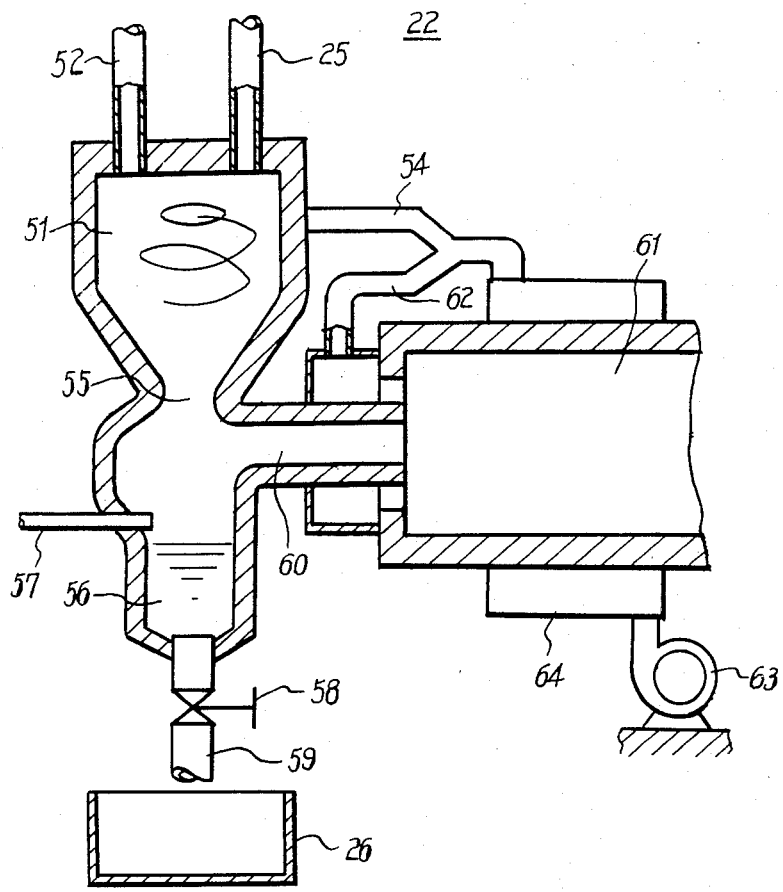
FIG. 8 is a vertical cross-sectional drawing showing one embodiment of ash disposer 22 used in this invention.

In FIG. 8, cyclone combustion chamber 51, in which the first of two stages of combustion is performed, has a cylindrical inner peripheral wall, and preheated primary air is supplied tangentially along the said inner peripheral wall through a primary air supply pipe 54.

The feed pipe 52 of dried sludge solid and the ash discharge end of ash discharge means 25 for the said gasification apparatus are mounted on the top of the cyclone combustion chamber. The primary air rate, which is controlled to be about 80% of the theoretical air rate for allowing the solid fed to this ash disposer to burn, can dispose chrome included in the sludge without harm. Hollow flame is turned in the said cyclone combustion chamber and the temperature of the flame rises to more than 1200° C. at a position near the inner peripheral wall.

A somewhat throttled section 55 is provided at the bottom of the said cyclone combustion chamber, and water tank 56 fed from supply pipe 57, has a water surface a little larger than the throttled sectional area and is provided just below the said throttled section. The exit pipe 59 with valve 58 is fitted to the bottom of the said water tank 56 in order to take out massive ash at any time. A flame way 60 is mounted on the side wall of throttled section 55, and a secoond-stage combustion chamber 61 is installed at the opposite end of flame way 60.

The combustion air is sent to air preheater 64 by blower 63, and the preheated air is divided into primary and secondary air; the secondary air, about 30% of the said theoretical air rate is supplied to the said second-stage combustion chamber through feed pipe 62. Combustion exhaust gas is discharged through pipe 28 fitted to the second-stage combustion chamber 61 as shown in FIG. 5, and then through heat exchanger 8, filter 9, and exhaust fan 10.

A sample ash of sewage sludge may contain alkali salts including a relatively high percentage of Na and/or $K$, and the melting point thereof is a relatively low temperature, from 700° to 800° C. The solid content of the sewage sludge is burnt and the ash thereof is melted in the cyclone combustion chamber. The melted liquid is allowed to flow downward along the inner peripheral wall and when it reaches the throttled section 55, where it forms large droplets, falls down, drops into water tank 56, and is solidified to massive ash.

The massive ash taken from carrying out means 26 can be used as concrete aggregate, since the former has a high hardness and is an alkali salt.

Figure 1:
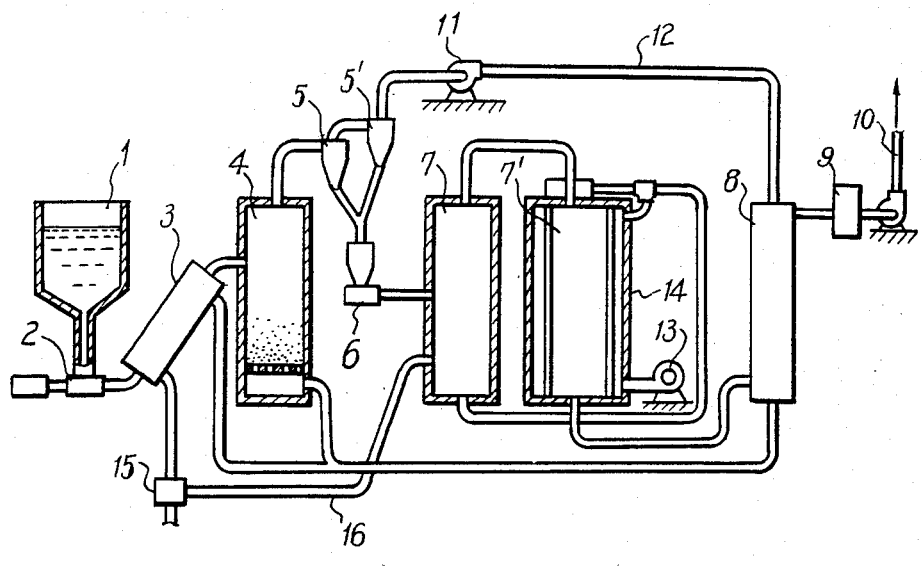
FIG. 1 is the drawing to explain the sludge incineration system which was previously developed and for which a patent was applied by this inventor.
Figure 2:
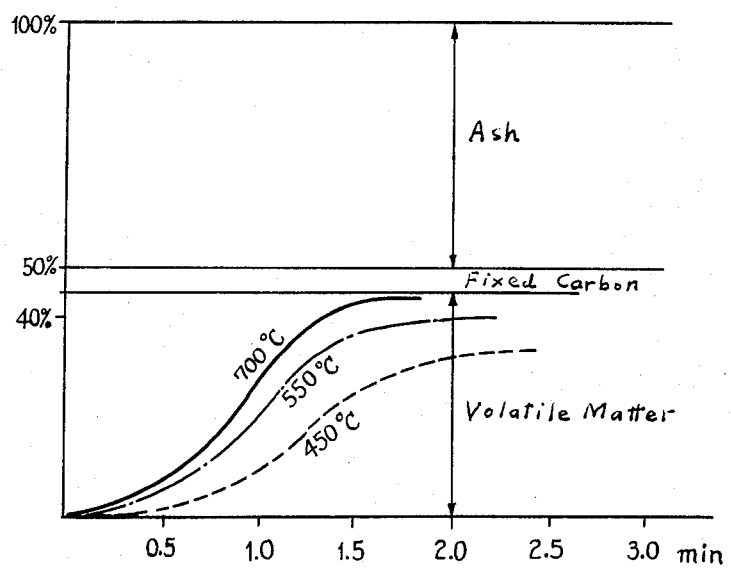
FIG. 2 is a graph showing the compositions of the dried sewage sludge solid and volatilization speed of the volatile matter at the respective temperatures.
Figure 3:
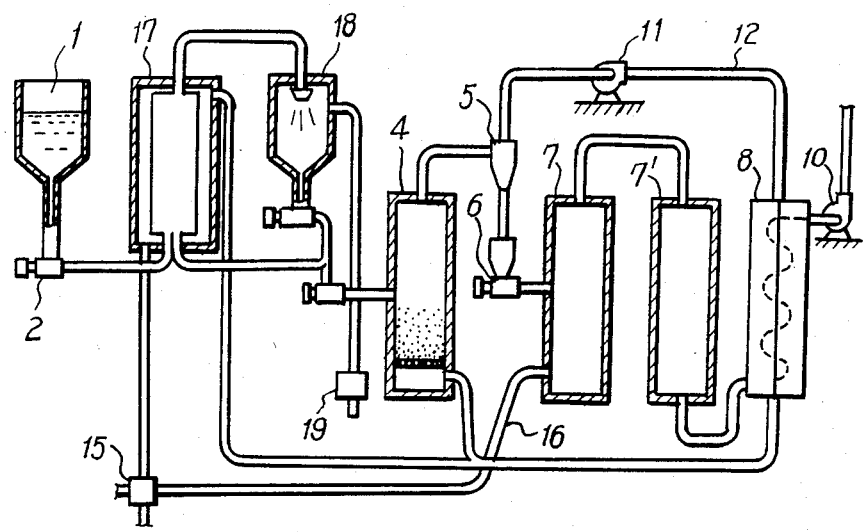
FIGS. 3 and 4 depict the sludge concentraion equipment which was previously developed and patented by this inventor.
Figure 4:
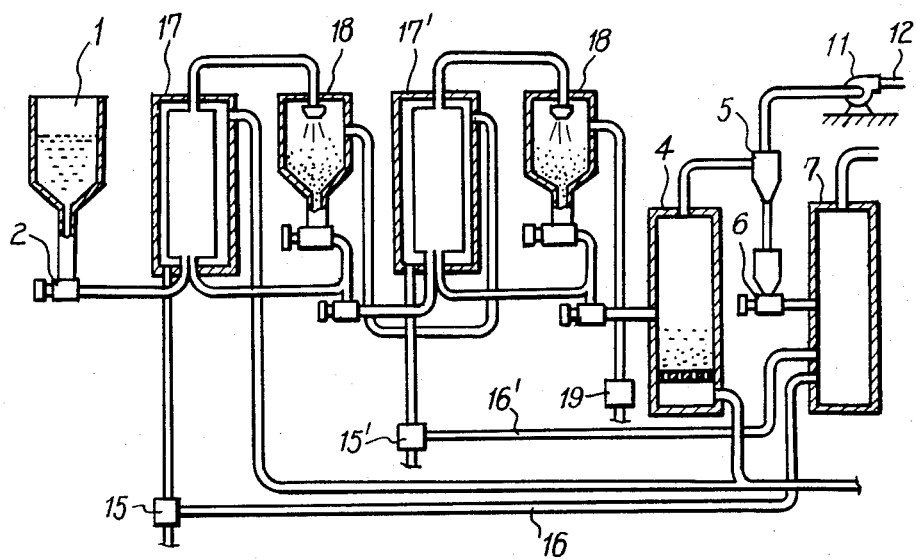

This inventor has developed concentration equipment which is far simpler than that shown in FIGS. 3 and 4 and which can easily increase the concentrated degree of sludge by connecting several sets in series before the system for recovering resources from sludge. If sludge is heated and dehydrated by concentration equipment 20 to reduce water contained in the sludge, the volume is greatly decreased as the water is removed in the later several processes, therefore, such disposers can be compacted very much and all the processes can smoothly be carried out, and in addition, resources can effectively be recovered.

Figure 9:
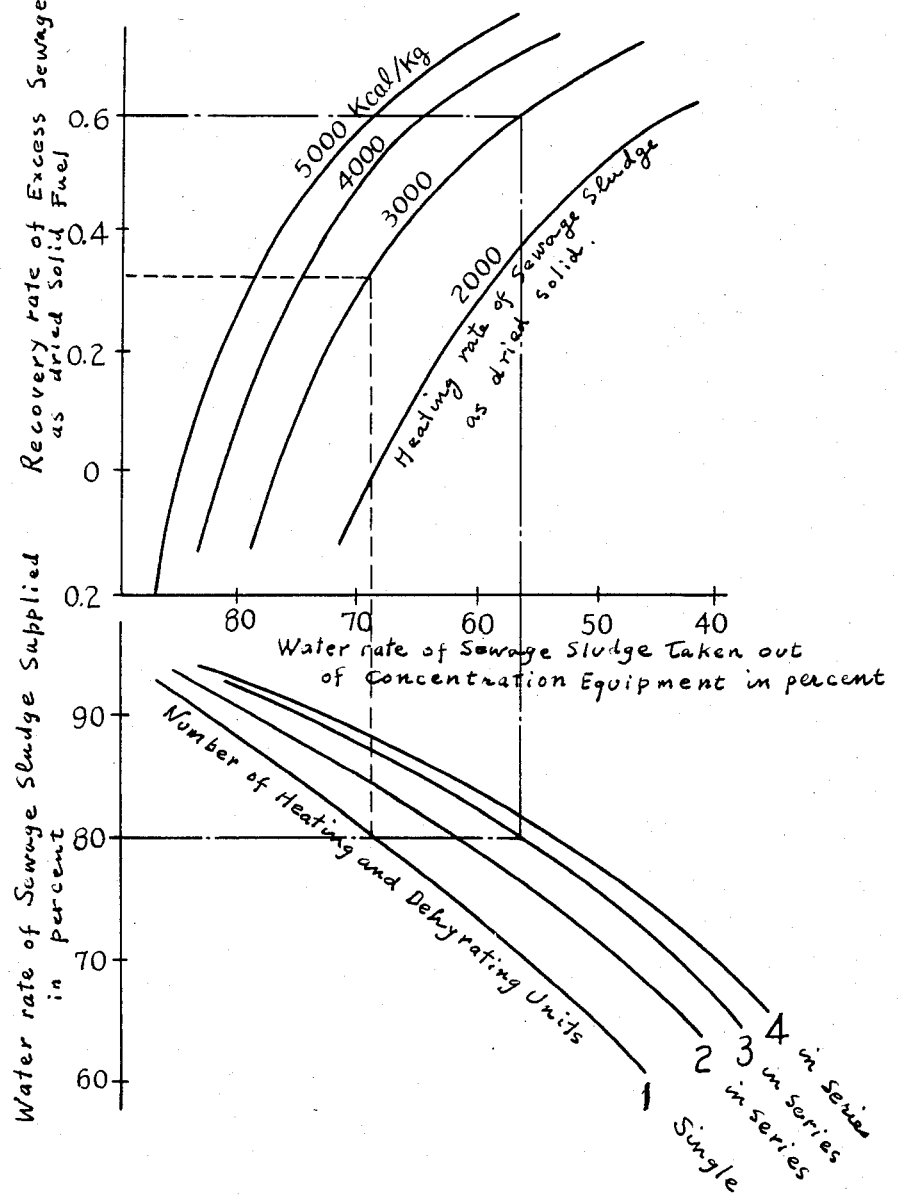
FIG. 9 is a graph showing the dehydration effect of the concentration equipment used in this invention.

In FIG. 9, the lower ordinate gives the water rate in percent of sewage sludge supplied to the system, the abscissa gives water rate in percent of sewer sludge taken out of the concentration equipment. The four curves about show respectively that the concentrated degrees differ, from number of the heating and dehydrating units of the concentration equipment. The graph above gives on the ordinate the percentage of the dried sewer sludge solid that may be obtained by recovering resources from sewer sludge as a heat source. The four curves show respectively that the heat source percentage recovered differs from the calorific values in dried sewage sludge solid, and each of them gives the calorific value, 2000, 3000, 4000 or 5000 kcal/kg.

For example, if the water rate of sewage sludge supplied is 80 percent and the number of the heating and dehydrating units of the concentration equipment is one, the water rate of sewage sludge taken out of the concentration equipment is 68 percent, and about 30 percent of the solid can be recovered as a heat source, if the calorific value of dried sewage sludge solid is 3000 kcal/kg. If the water rate of sewage sludge taken out of the concentration equipment is 80 percent and the calorific value of dried sewage sludge is 3000 kcal/kg when number of the heating and dehydrating units of the concentration equipment is three, the water rate of sewage sludge taken out of the said concentration equipment is 60 percent and heat recovery, about 60 percent can be obtained by this system for recovering resources from sludge.

That is, when the three heating and dehydrating units are installed and sewage sludge as much as 100 tons with water rate of 80 percent is treated every day, the compositions of sewage sludge supplied are solid 20 tons/day and water 80 tons/day. The 80 tons/day of water is reduced to 30 tons/day by the concentration equipment having the three heating and dehydrating units, while the 20 tons/day of solid is unchanged. As a result, the sewage sludge, after being taken out of the said concentration equipment, consists of solid, 20 tons/day and water, 30 tons/day, totally 50 tons/day. This is about one half as compared with the rate as supplied and the solid, 60 percent or 12 tons/day or 3.6 million kcal/day can be recovered as a heat resource. In addition, the installation capacity in the equipment performing the several processes after the concentration equipment may greatly be reduced.

Figure 10:
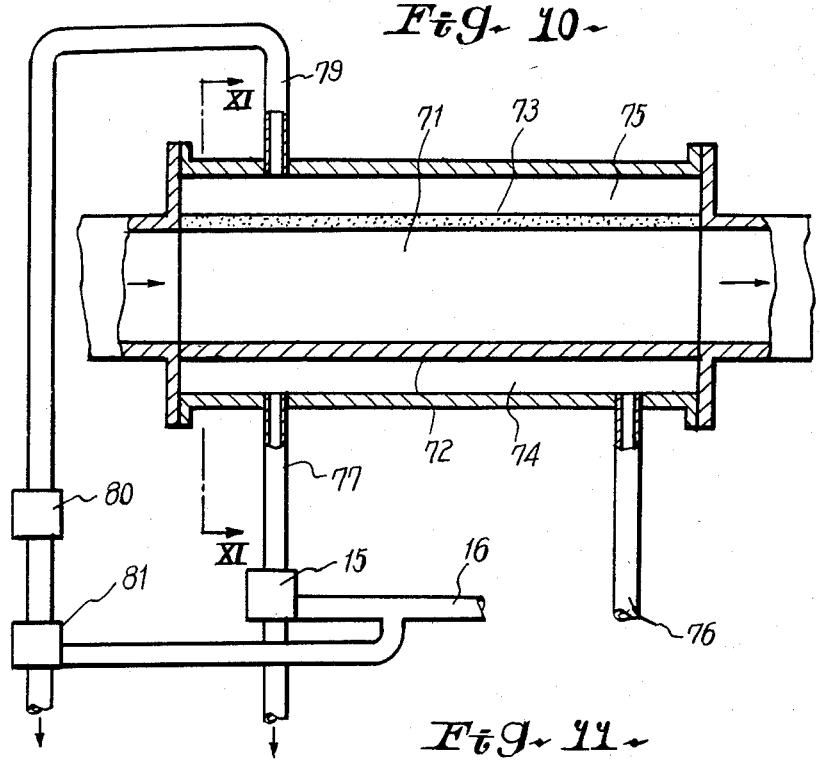
FIGS. 10 and 11 are respectively side and IX—IX cross-sectional drawings of the concentration equipment with one heating and dehydrating unit used in the system for recovering resources from sludge relating to this invention.
Figure 11:
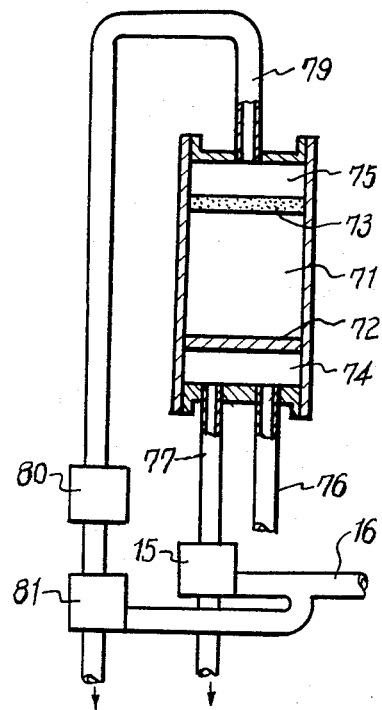

The concentration equipment 20 installed after forced supply means 2 in the system for recovering resources from sludge relating to this invention shown in FIG. 5 consists of, for example, one heating and dehydrating unit having the construction given in FIG. 10 and 11. Namely, sludge supply passage 71 is provided for at the center. Sludge is sent from the left to the right as shown with the arrow mark, and there is a forced sludge supply means such as screw-type extruder 2 leftward and drying furnace 4 having a fluidized sand bed rightwards. The one side wall of the said supply passage 71 is made of heat conductive material 72 such as a metallic plate, the other side wall 73 is, for example, made of metal meshes, sintered metal or porous ceramic with many holes from 2 to 100 microns in diameter, and on the outside of them, jackets 74 and 75 are respectively mounted. Heating gas feed pipe 76 is connected with jacket 74 having the said heat conductive wall 72, and exhaust pipe 77 with drain separator 15 is fitted to jacket 74. The suction pipe with cooler 80 and drain separator 81 is fitted to jacket 75 having the said ventilating porous wall 73.

The heating gas supplied to this heating and dehydrating unit through feed pipe 76 is sent through gaseous fuel supply pipe 16 and the gaseous fuel is recovered after the gas has cooled, discharged through exhuast pipe 77 and the drain has been removed out of the system. Jacket 75 is connected with suction pipe 79 having cooler 80, and the inside is under a negative pressure about 0.5 kg/cm$_2$abs.

The water content and the volatile matter in sludge is actively vaporized. The gas drawn from the said suction pipe 77 is sent through gaseous fuel supply pipe 16 and the gaseous fuel is recovered after the gas is cooled and the drain is removed out of the system.

Further, concentration equipment 20 installed downstream of forced supply means 2 in the system for recovering resources from sludge relating to this invention can consist of the heating and dehydrating units, including several ones in series. For example, FIG. 12 gives the three heating and dehydrating units, $U_1$, $U_2$, and $U_3$ connected in series. That is, cooler 80 and drain separator 81 are mounted on suction pipe 79-1 of the first heating and dehydrating unit, $U_1$. In addition, exhaust pipes 77, 77' and 77'' respectively with drain separator, 15, 15' and 15'' are fitted respectively to heating and dehydrating units $U_1$, $U_2$, and $U_3$. High temperature and high pressure heating gas supply pipe 76-3 is connected only to jacket 74'' with the heat conductive wall of the third heating and dehydrating unit $U_3$, supply pipe 76-1 of the first heating and dehydrating unit $U_1$ is connected with suction pipe 79'-2 of the second heating and dehydrating unit $U_2$; and supply pipe 76'-2 of the second heating and dehydrating unit $U_2$ is connected with suction pipe 79''-3 of the third heating and dehydrating unit $U_3$.

For the concentration equipment consisting of the three heating and dehydrating units in series as given by FIG. 12, the pressure in Jackets 73-2 and 73-3 is about 0.5 kg/cm$^2$ abs.; therefore, a water evaporating temperature is about 80° C. However, a pressure in jackets 73-2 and 75-1 is about 0.2 kg/cm$^2$ abs. and the water evaporating temperature becomes 60° C.; a pressure in jacket 73-1 is about 0.1 kg/cm$^2$ abs. and the water evaporating temperature becomes 40° C.; therefore, the water content in sludge can actively be vaporized in each unit.

Moreover, at the positions of forced supply means 2 and concentration equipment 20 in the system for recovering resources from sludge relating to this invention shown in FIG. 5, such equipment can be used as alternatives that a concentration equipment having one heating and dehydrating unit is operated with a supply means to push out sludge toward a supply pipe intermittently under a strong pressure and a concentration equipment consisting of the said heating and dehydrating units, several ones in series. At first, the supply means to push the sludge toward the supply pipe intermittently under a strong pressure is explained according to FIGS. 13 and 14.

Exit pipe 91 is fitted to the bottom of sludge storage hopper 1, piston 94 is arranged to be reciprocated by crank shaft 92 and connecting rod 93 is engaged in cylinder 95. Ball valve 96 is contained in casing 97 at the force end of the said cylinder 95, curved passage 98 is made in the said ball valve, and operation lever 99 allowing the ball valve to be turned is interlocked with the reciprocating motion of piston 94.

Figure 15:
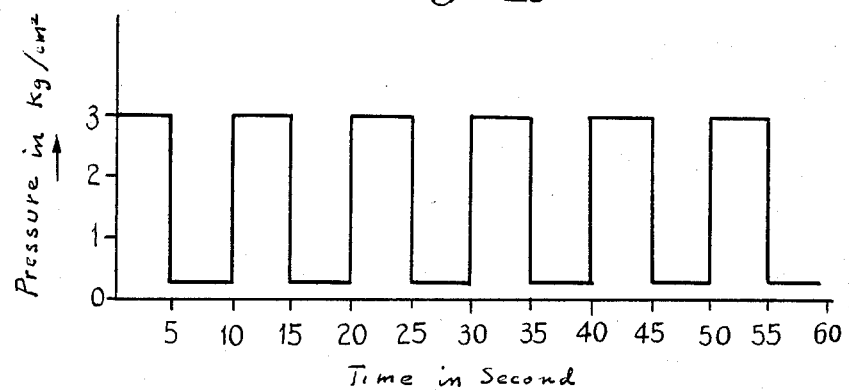
FIGS. 15 and 16 are graphs showing the time lapse of the change in pressures in supply pipe 100 at the positions before and after the heating and dehydrating devices connected with respective supply pipes 100 of the concentration equipment, as combined with the supply means to push the sludge toward the said supply pipes 100 intermittently under a strong pressure, as an example.
Figure 16:
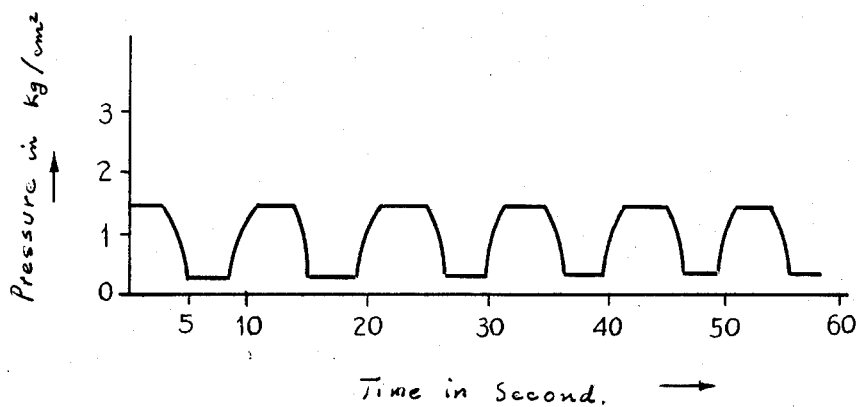

As given in FIG. 13, when piston 94 is moved backward to a suction status, the fore end of curved passage 98 in the said ball valve is communicated with exit pipe 91. On the other hand, when piston goes forward to a pushing out status, the fore end of curved passage 98 in ball valve 96 is communicated with supply pipe 100. The graphs shown in FIGS. 15 and 16 illustrate the change in pressures with time at the upstream end 101 of the said supply pipe 100 before sludge is introduced into the heating and dehydrating unit and the change in pressures with time lapse at the downstream end 102 of the said supply pipe 100 after the sludge passes through the one or several heating and dehydrating units, when the said supply means by which the sludge is forcibly pushed out toward the supply pipe intermittently under a strong pressure.

The heating and dehydrating unit operated with the said intermittent supply means above is explained according to FIGS. 17, 18 and 19 as follows:

A part of heat conductive pipe 103 and a part of ventilating porous pipe 104 connected therewith are fitted to supply pipe 100. Jacket 105 is provided for covering the said heat conductive pipe, and jacket 106 is also provided for covering the said ventilating porous pipe 104. Heating gas supply pipe 107 and exhaust pipe 108 having separator 15 are fitted to jacket 105 for covering the said heat conductive pipe. Cooler 110 and suction pipe 109 with drain separator 111 are mounted on jacket 106 for covering the said ventilating porous pipe.

The gas for heating supplied to this heating and dehydrating unit through feed pipe 107 is sent through gaseous fuel feed pipe 16. After the gas is used for heating, it is discharged through exhaust pipe 108 and the drain is removed out of the system, and the gaseous fuel is recovered.

By this heating and dehydrating unit, sludge pressures in feed pipe 100 are repeatedly increased intermittently and then become normal. The sludge is heated up to a high temperature with heating as fed into jacket 105, however, the sludge including water and volatile matter may not be easily evaporated and volatilized under a high pressure. If the sludge is placed under a normal pressure at the next moment, the water and the volatile matter in the sludge are actively vaporized. Even though pressurized again, such water and volatile matter exist in the sludge as compressed gas. Later, when the sludge including the compressed gas, water and liquid volatile matter is transferred up to ventilating porous pipe 104, because a pressure in jacket 106 with suction pipe 109 is negative, the water and the volatile matter are actively vaporized, and this vaporized gas is immediately sucked from jacket 106 to suction pipe 109 with a cooler. The vaporized gas sucked is cooled by cooler 110 and is recovered as gaseous fuel by the pipe 16, after the drain is removed out of the system by drain separator 111.

Figure 17:
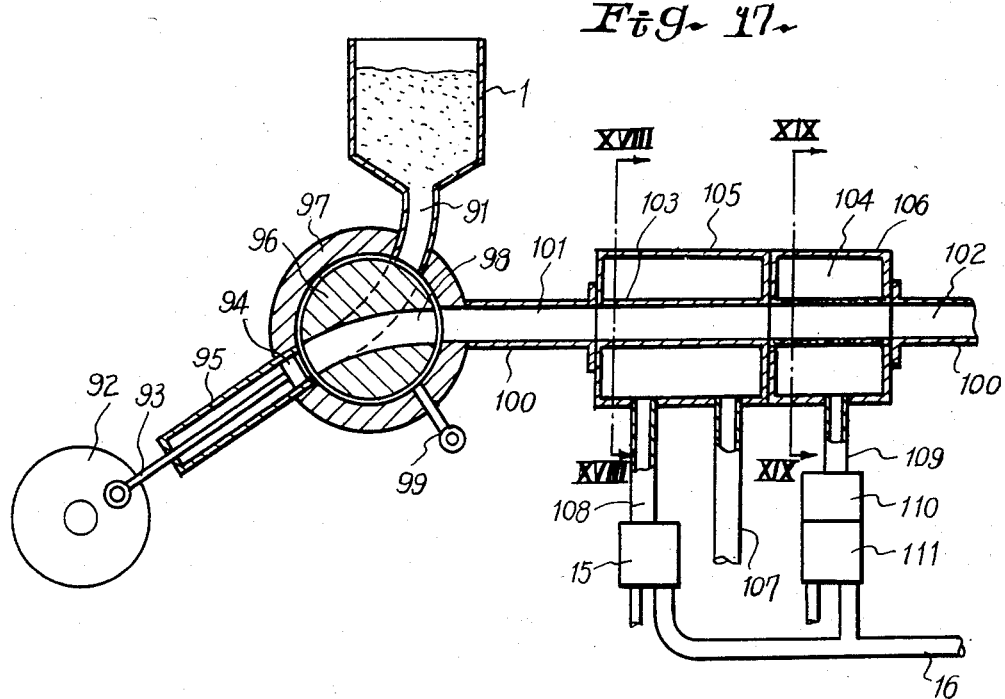
FIGS. 17 and 20 are respectively side cross-sectinal drawings of the supply means to push out sludge into supply pipes 100 intermittently under a strong pressure.
Figure 18:
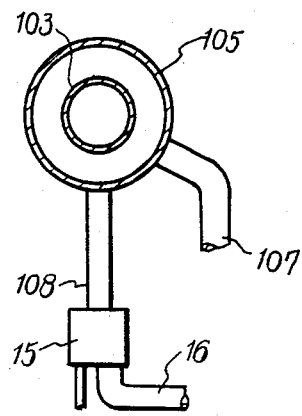
FIGS. 18 and 19 are respectively cross-sectional drawings at XVIII—XVIII and XIX—XIX in FIG. 17.
Figure 19:
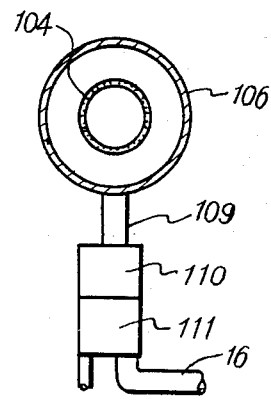
Figure 20:
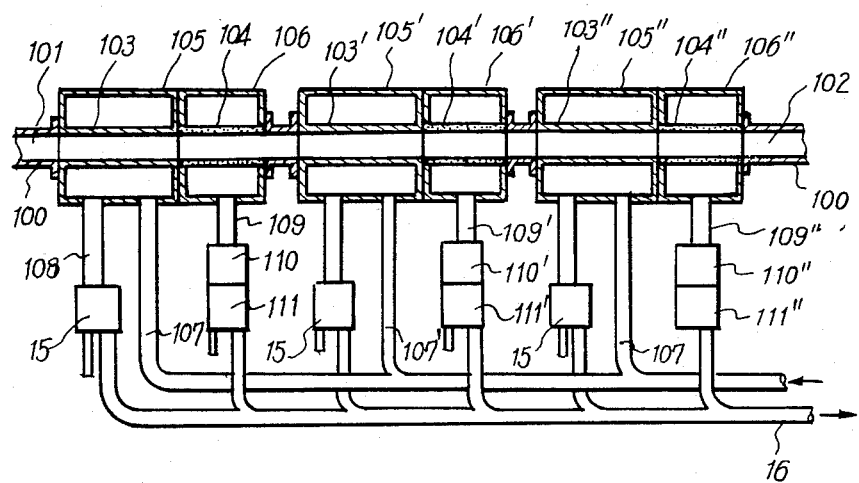

FIG. 20 gives the three heating and dehydrating units as shown in FIGS. 17, 18 and 19, connected in series.

The apparatus as shown in FIG. 20 has the same effect as shown by the graph in FIG. 9.

What I claim is:

1. An apparatus for recovering resources from sludge comprising a hopper to hold sludge to be processed, a forced supply means on the bottom of said hopper, concentration means connected to said hopper, said forced supply means being for forcing sludge from said hopper to said concentration means in which sludge is heated and dehydrated, drying furnace means having a fluidized sand bend and connected to said concentration means, a blower downstream of and connected to said furnace means which draws dried sludge products from said furnace to separator means connected to said furnace means, in which separator means solid and gas components of dried sludge are separated, heat exchanger means located downstream from and connected to said blower, said blower being capable of pressurizing said gas and feeding it downstream to said heat exchanger where the gas is heated, recycle means downstream of and connected to said heat exchanger for returning part of the gas to said drying furnace means and for returning the remainder of the gas to said concentration means, supply means downstream of said separator for supplying dried sludge solids to a gasification apparatus to recover gaseous fuel, and to an ash disposer connected with said gasification apparatus in which ash is allowed to solidify from melted sludge ash to recover massive ash, said gasification apparatus including a cylindrical combustion chamber having a gas burner in the bottom thereof, said combustion chamber having a rotable peripheral wall with outwardly extending agitating vanes and means for rotating said peripheral wall, a distillation chamber around said combustion chamber into which the vanes extend, said supply means communicating with the top of the distillation chamber, said distillation chamber further including a gaseous fuel exit at the top thereof, and a feed pipe for gas for promoting volitilization and an ash exit communicating with the bottom of said distillation chamber, and means downstream of and connected with said concentration means for removing the liquid drained from a gas supplied to the concentration means and the gas evaporated in said concentration means.

2. An apparatus as claimed in claim 1 in which said ash disposer comprises a cyclone combustion chamber having a cylindrical inner circumferential wall, a sludge solid feeder connected to said cyclone combustion chamber, a primary air feed pipe supplying air tangentially along said inner circumferential wall, a throttled section below said combustion chamber and a water tank just below said throttled section, a flame tube extending to the side midway between said combustion chamber and said water tank, and a second stage combustion chamber downstream of said flame tube.

3. An apparatus as claimed in claim 1 in which said concentration means has a central sludge feed tube, one side wall of which is heat conductive and another side wall of which is porous, a first jacket surrounding said heat conductive side wall and a second jacket surrounding said porous sidewall, a heating gas feed pipe fitted to said first jacket, an exhaust gas pipe fitted to said first jacket for transmitting gas from said second jacket through a drain separator to a gaseous fuel feed pipe, a suction pipe fitted to said second jacket for transmitting gas from said second jacket through a cooler and a drain separator to said gaseous fuel feed pipe.

4. An apparatus as claimed in claim 3 wherein said concentration means comprises more than one set of first and second jackets and the suction pipes of downstream second jackets are connected with the next upstream heating gas feed pipe.

5. An apparatus as claimed in claim 1 in which said forced supply means supplies sludge to said concentration means intermittently under strong pressure and said concentration means comprises a heat conductive pipe followed by a ventilating porous pipe, a first jacket covering said heat conductive pipe, a heating gas feed pipe communicating with said first jacket and an exhaust pipe fitted to said first jacket haing a drain separator and communicating with a gaseous fuel supply pipe, a second jacket covering said ventilating porous pipe, a suction pipe fitted to said second jacket and communicating with said gaseous fuel supply pipe by way of a cooler and a drain separator, whereby gaseous fuel products in said sludge may be recovered.

* * * * *